(12) United States Patent
Fröhlich et al.

(10) Patent No.: US 7,687,654 B2
(45) Date of Patent: Mar. 30, 2010

(54) SILANE-BASED RESINS THAT CAN BE PHOTOCHEMICALLY AND/OR THERMALLY STRUCTURED, SINGLE-STEP METHOD FOR THEIR PRODUCTION, PARENT COMPOUNDS AND PRODUCTION METHODS THAT CAN BE USED FOR SAID RESINS

(75) Inventors: Lothar Fröhlich, Würzburg (DE); Stephane Jacob, Würzburg (DE); Michael Popall, Würzburg (DE); Ruth Houbertz-Krauss, Werneck (DE)

(73) Assignee: Fraunhofer-Gesellschaft zur Förderung der angewandten Forschung e. V., München (DE)

( * ) Notice: Subject to any disclaimer, the term of this patent is extended or adjusted under 35 U.S.C. 154(b) by 0 days.

(21) Appl. No.: 12/029,493

(22) Filed: Feb. 12, 2008

(65) Prior Publication Data

US 2008/0194856 A1 Aug. 14, 2008

Related U.S. Application Data

(62) Division of application No. 10/491,588, filed as application No. PCT/EP02/11160 on Oct. 4, 2002, now Pat. No. 7,348,393.

(30) Foreign Application Priority Data

Oct. 4, 2001 (DE) ................................ 101 48 894

(51) Int. Cl.
C07F 7/08 (2006.01)
(52) U.S. Cl. ...................................... 556/466; 556/463
(58) Field of Classification Search ................. 556/466, 556/463
See application file for complete search history.

(56) References Cited

U.S. PATENT DOCUMENTS

| | | | |
|---|---|---|---|
| 3,364,246 A | 1/1968 | Rossmy | |
| 4,207,247 A | 6/1980 | Knollmueller | |
| 4,352,894 A | 10/1982 | Schmidt | |
| 4,395,563 A * | 7/1983 | Hayes | ........................ 556/459 |
| 4,517,375 A | 5/1985 | Schmidt | |
| 4,708,743 A | 11/1987 | Schmidt | |
| 5,488,125 A | 1/1996 | Omura | |

OTHER PUBLICATIONS

Fukukawa et al., Science and Ind., (Japan), 28, (1954), pp. 261-267; abstract only.*
Noll, W.: Chemistry and Technology of Silicones; 1968; Academic Press Inc.; pp. 94-97.

* cited by examiner

*Primary Examiner*—Elvis O Price
(74) *Attorney, Agent, or Firm*—Gudrun E. Huckett

(57) ABSTRACT

A silane resin that can be structured photochemically and/or thermally is obtained by at least partial condensation of a mixture of a) at least one silane compound $R_a R^2_b SiX_{4-a-b}$ wherein R is a group polymerizable photochemically and/or thermally via an organic group by radical or cationic polymerization; $R^2$ is a straight-chain, branched, or cyclic $C_1$-$C_{12}$ alkyl group; X is identical or different and is a leaving group; a is 1 or 2; b is 0 or 1; a+b is not more than 2; and b) at least one silanediol $R^1_2 Si(OH)_2$ wherein $R^1$ is identical or different and is a straight-chain, branched, or cyclic $C_1$-$C_{12}$ alkyl group or a group polymerizable photochemically and/or thermally via an organic group by radical or cationic polymerization, provided the group does not contain aryl. The silane resins have dielectric properties useful in extremely high frequency applications.

4 Claims, 2 Drawing Sheets

SILANE-BASED RESINS THAT CAN BE PHOTOCHEMICALLY AND/OR THERMALLY STRUCTURED, SINGLE-STEP METHOD FOR THEIR PRODUCTION, PARENT COMPOUNDS AND PRODUCTION METHODS THAT CAN BE USED FOR SAID RESINS

This application is a divisional application of U.S. patent application Ser. No. 10/491,588 having a filing date of Apr. 2, 2004, the disclosure of which is incorporated in its entirety into the instant application; which application Ser. No. 10/491,588 is a national stage filing of international application No. PCT/EP02/11160 having a filing date of Oct. 4, 2002 and the disclosure of which is incorporated in its entirety into the instant application.

BACKGROUND OF THE INVENTION

The present invention relates to silane resins that can be structured (also referred to as organically modifiable (hetero) silicic acid poly condensates or organopolysiloxanes) that are reacted when exposed to radiation (in particular, in the UV range) or reacted thermally to inorganic-organic, O—Si—O group containing hybrid polymers with improved dielectric properties as well as excellent substrate adherence and, in particular, can be processed to structured layers. These materials are suitable for use in high and extremely high frequency ranges (for example, as multi-layer systems in SBU (sequential build-up) technology, in multi-layer thin-film circuits (TFC)). The invention further relates to a method for producing such silane resins. Finally, the invention relates to intermediates with which the aforementioned polymers can be produced, as well as a method for their preparation.

Polymers are used in various day-to-day applications well as in a series of high-tech uses (for example, information acquisition, information processing, and information transfer). Compared to purely organic polymers, organic-inorganic hybrid polymers, for example, those that are commercially available under the trademark ORMOCER® registered to the Fraunhofer Gesellschaft, exhibit in general excellent temperature resistance and thermal shape stability, excellent adherence to a plurality of materials, and many other beneficial properties. Such hybrid polymers are prepared in general by the so-called sol-gel process according to which the monomer or pre-condensed components (in general, optionally organo-modified silanes, partially in combination with additional metal-alkoxy compounds and/or other compounds) are subjected to hydrolysis and condensation of the appropriate groups. After removing, exchanging or supplementing the solvent that is present or the solvent that has been produced, a low viscosity to high viscosity resin or a lacquer is obtained that can be brought into a suitable form, for example, as a coating of substrate, as a shaped body, or as a diaphragm that, after shaping, can be dried, optionally can be cured further by polymerization of the organic groups that are present. The last-mentioned organic polymerization, if desired, can be realized only at predetermined locations, for example, for curing by selective irradiation by means of actinic radiation, wherein subsequently the material that has not been polymerized can be removed by means of suitable solvents. In this way, it is possible to obtain photo-lithographically structured three-dimensional bodies or surfaces. For example, DE 199 32 629 A1 discloses organo-modified silicic acid polycondensates that are stable under storage conditions, can be UV-cured and can be photo-structured; the polycondensates are transparent in the near infrared range (NIR). These resins can be used, for example, as a photoresist, as a photoresist with negative resist behavior, or as a dielectric (generally an insulating material) for microsystems technology (includes inter alia microelectronics, microoptics, and micromechanics).

Support materials for thin film circuits are partially ceramic materials that are directly developed for hybrid applications; silicon wafers; or organic materials of the printed circuit board technology and semiconductor technology. Their dielectric or other properties, however, would not appear to make them useful in application in connection with the extremely high frequency range. For example, commercially available dielectrics (for example, benzocyclobutene: BCB such as Cyclotene™ 4026-46 of the Dow Chemical Company; polyimide PI: Pyraline™ 2722 of the DuPont Company; or glass fiber-reinforced PTFE laminate: RT/Duorid™ 5880 of the Rogers Corporation) exhibit good dielectric properties (for example, $\epsilon_r<3$ and $\tan \delta=40-8\cdot10^{-3}$) within the low high frequency range (10 kHz). Moreover, with the aforementioned glass fiber reinforced PTFE laminate it has been shown also that attenuation values $\tan \delta<3\cdot10^{-3}$ in the lower extremely high frequency range at approximately 10 GHz can be obtained. The class of polyimides that can be structured by UV and the class of the benzocyclobutenes exhibit stability at higher temperatures but are designed only for thin film applications (processable film thickness for each layer $\leq 25$ μm) and require curing conditions that must be critically reviewed in connection with sensitive components. A further disadvantage of these materials resides in that the adhesion strength varies greatly with the substrate properties and that these materials partially cannot be structured by means of conventional lithography. The high mechanical and thermal stability expected from the dielectric is not ensured when using such materials.

Inorganic-organic hybrid polymers containing O—Si—O groups are also suitable for use in the microelectronics industry. Resins and lacquers of such materials can have properties that enable their use as dielectrics in the low high frequency range. With them, it is possible to obtain, for example, dielectric constants of up to $\epsilon_r\approx 3$ and dielectric loss of up to $\tan \delta\approx 4\cdot10^{-3}$ at 10 kHz. For applications in high and extremely high frequency range the known materials are not useable however. For example, it was found that the UV-structured resins disclosed in the already mentioned DE 199 32 629 A1, which resins, because of their high transparency and good mechanical properties, would appear to be well suited for applications considered in the instant invention, exhibit significantly decreased values within the extremely high frequency range (in the GHz range). For example, a polymer of diphenyl silanediol and methacryloxy propyl trimethoxy silane in this range shows a loss of $\tan \delta$ of 0.03. Accordingly, the application of such materials as a dielectric for extremely high frequency applications in communications technology (RF sending and receiving modules; multichip modules, MCM) or in the automobile industry (distance radar, multilayer thin/thick film circuits, TFC) has not been found to be satisfying up to now. This is so because such applications pose extreme requirements with regard to the properties of the dielectric in the microwave range, in particular, for frequencies between 10 and 100 GHz.

SUMMARY OF THE INVENTION

It is an object of the present invention to provide materials whose dielectric properties within the high and extremely high frequency range (primarily between 10 and 100 GHz) are around $\epsilon_r<3$ and $\tan \delta<5\cdot10^{-3}$ and which, moreover, have at least partially thermal, mechanical, and adhesive properties that exceed those of conventional, purely organic materials employed in extremely high frequency applications.

It has been surprisingly found that materials which are produced by employing a monomeric silanediol and at least one additional monomeric silane component and in which the silane component has at least one organically crosslinkable group that is bonded by carbon to the silicon atom, have the desired dielectric properties when the employed silanediol has no aryl group.

Preferably, the employed silanediol is an aliphatic silanediol whose organic group preferably have a significant sterical requirement, for example, isobutyl, isopropyl, or cyclohexyl.

The other monomeric silane component is a compound with two or three groups which in the presence of hydroxy groups of the silanediol and optionally of a catalyst for condensation function as the leaving groups (they will be often referred to in the following only as "leaving groups" for reasons of simplification), for example, halogen; optionally substituted alkoxy, acyloxy, alkoxy carbonyl or $NR^3$ with $R^3$ equal hydrogen or lower alkyl. Alkoxy groups with particularly one up to four carbon atoms and lower alkyl groups of the same chain length are preferred. In principle, the leaving groups can also be OH groups. However, this is less favorable because the inorganic condensation reaction produces water that, in turn, can cause a reversibility of the reactions so that secondary reactions can no longer be excluded (see also infra). Moreover, the aforementioned silane component, as mentioned, has one or two organically crosslinkable groups that are stable with regard to hydrolysis and can be polymerized thermally and/or photo-chemically, for example, in the presence of UV photo-initiators. This group/these groups is/are bonded by a carbon to the silicon atom.

The aforementioned hybrid materials can be prepared by a single-step method wherein the reaction is carried out preferably in the absence of water. In this way, an unequivocal reaction route is forced. Secondary reactions are suppressed. By selecting suitable condensation catalysts and defined temperature ranges and reaction times, the reaction takes place within narrow stoichiometric limits when using the starting components in suitable quantitative ratios. Surprisingly, it was found that the selection of the condensation catalyst can be critical in some cases. In particular, the catalyst barium hydroxide proposed in DE 199 32 629 A1 is generally unsuitable. In contrast, good results can be obtained, for example, with ammonium fluorides, in particular, with tetrabutyl ammonium fluoride (in the form of the trihydrate). Because of the absence of water, the method reliably and reproducibly leads to products with the desired material properties such as viscosity, solubility, refractive index, substrate adhesion, temperature resistance, and dielectric properties. In particular, an excellent and unexpected temperature resistance is exhibited by the materials. The reproducibility of the course of the process is a prerequisite for the success of the plurality of process steps that are required for the photo-lithographic structure generation (application method, for example, by spin-casting ("spin on"); pre-treatments such as pre-drying or pre-curing; photo polymerization; intermediate treatment, for example, postexposure bake; development; post treatment, for example, post baking), and thus for the use in the microsystems technology and for the reliability of the component that is finally produced.

In Chemical Abstracts 1996, 127:293965 the kinetics of the photochemical polymerization of the reaction product of methacrylic acid (dihydroxy-methyl-silyl) methylester with dimethyl silanediol was examined. This reaction product and its polymerized product are not encompassed by the present invention.

The present invention moreover provides a new method with which the silanediols to be used as a starting material can be produced. This method enables the gentle preparation of silanediols in a reliable and reproducible yield; this has been a problem in the past because of possible secondary reactions (further reaction to polymer products). Also, previously unknown silanediols that are well suited as starting materials for the silane resin according to the invention can be prepared by this method.

DESCRIPTION OF PREFERRED EMBODIMENTS

Figure 1:
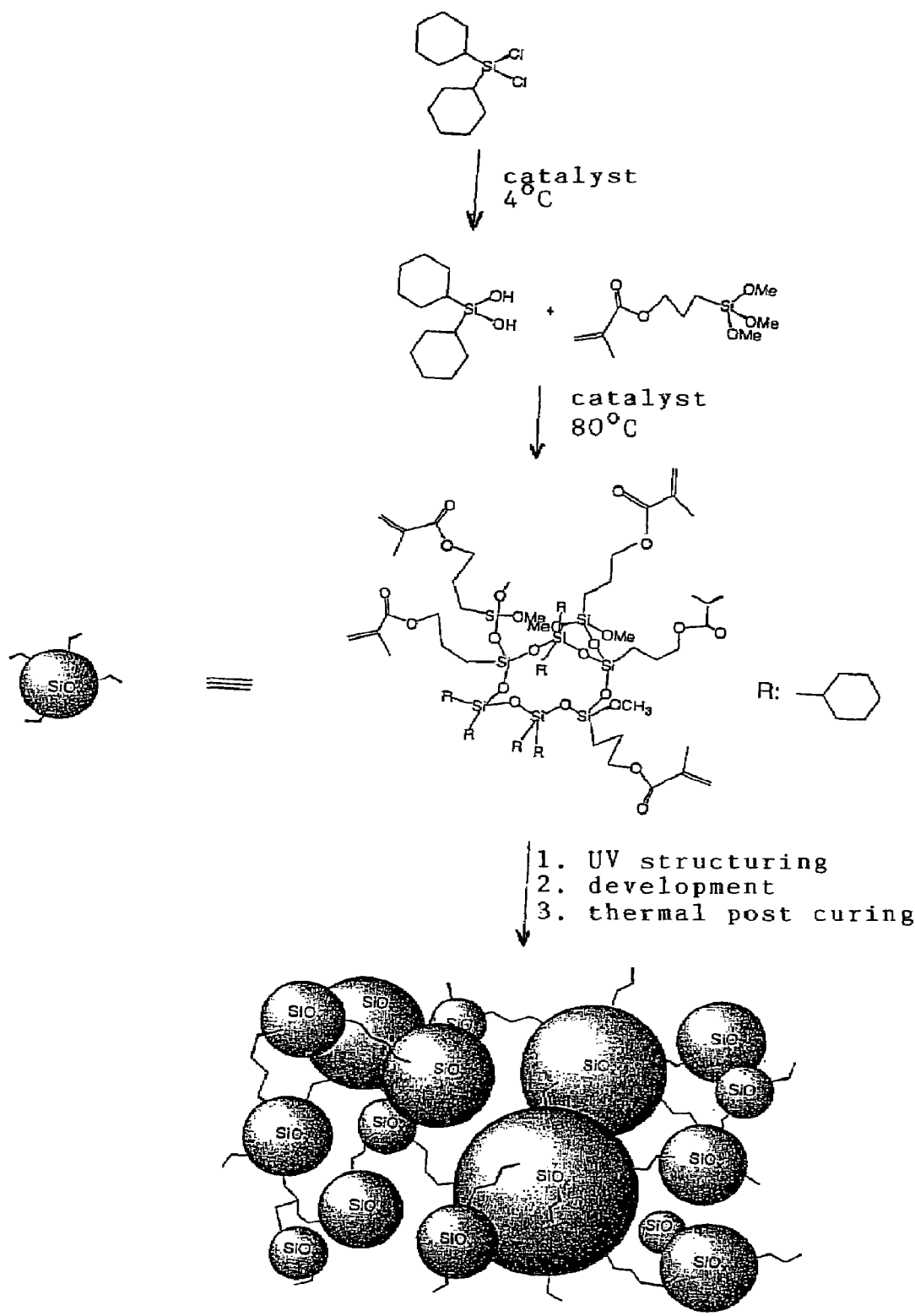
FIG. 1 shows schematically the preparation of a silane resin according to the invention by employing by dicyclohexyl silanediol produced from dicyclohexyl dichlorosilane and methacryloxy propyl trimethoxy silane. The resin can be polymerized organically, for example, by means of UV radiation (after adding UV photoinitiators) and can be optionally structured, resulting in an inorganic-organic hybrid polymer.
Figure 2:
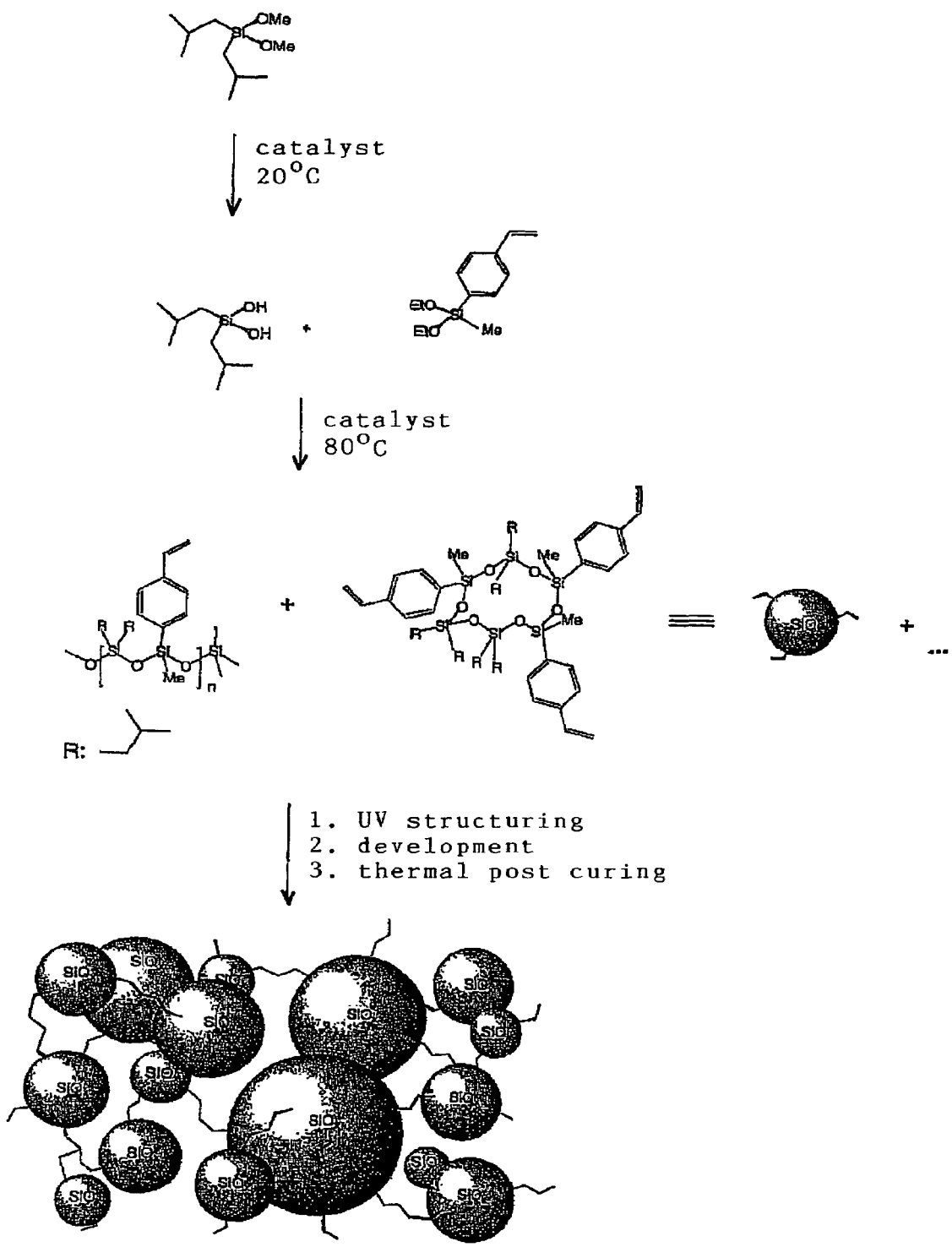
FIG. 2 shows also schematically the preparation of a silane resin according to the invention from diisobutyl silanediol, derived from diisobutyl dimethoxy silane, and styryl methyl diethoxy silane as well as the inorganic-organic hybrid polymer obtained therefrom by UV irradiation (after adding UV photoinitiators).

The silane resins according to the invention can be produced by means of the known "modified" sol-gel method. For this purpose, the silane components are placed into a vessel in a suitable solvent and subjected in a targeted fashion to a condensation reaction, preferably in the presence of a suitable catalyst. Silane components that are suitable for condensation are silanes of the general formula (I)

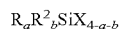

$$R_a R^2{}_b SiX_{4-a-b}$$

wherein R is a group that can be polymerized by radical polymerization or cationic polymerization in the presence of light, in particular, UV radiation, or thermally organically; wherein $R^2$ is a straight-chain, branched or cyclic, optionally substituted, $C_1$-$C_{12}$ alkyl group; wherein X is identical or different and, in the presence of an OH group and optionally of a condensation catalyst is a leaving group; wherein a is 1 or 2; wherein b is 0 or 1; and wherein a+b are not more than 2. R is preferably selected from substituents having a significant sterical requirement, for example, those of styryl or containing styryl, (meth)acryloxyalkyl or glycidoxyalkyl, for example, methacryloxypropyl or glycidoxypropyl. Even more preferred R contains or is a styryl group and/or a methacrylic acid group. It is particularly favorable when a is 1 and b 1, wherein R is especially preferred styryl. In this embodiment, the group $R^2$ is preferably an alkyl group; most preferred in this embodiment is $R^2$ equal methyl. However, the group $R^2$ can also be voluminous and, for example, can be, optionally substituted, i-propyl, i-butyl, t-butyl or cyclohexyl. X is preferably selected from $C_1$-$C_6$ alkoxides; methoxy or ethoxy groups are most preferred.

The silanediol is preferably a silane of the general formula (II)

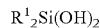

$$R^1{}_2 Si(OH)_2 \quad \quad \text{(II)}$$

wherein $R^1$ is identical or different and is a straight-chain, branched, or cyclic, optionally substituted, $C_1$-$C_{12}$ alkyl group. $R^1$ can be instead also a group that can be photochemically or thermally polymerized by means of an organic group, in particular, an organically polymerizable group that can be polymerized by cationic or radical polymerization in the presence of UV radiation, with the proviso that it does not contain an aryl group. The groups that are preferably used for R in the formula (I) are also preferred for the group $R^1$, with the exception of the styryl group. However, it is preferred that the silanediol does not have an organically crosslinkable group, i.e., that $R^1$ is thus an alkyl group as defined above whose optionally present substituents are selected from those that do not undergo polymerization, for example, halogen.

As needed, one or also several silanes of the formulas (I) and (II) can be used. The stoichiometric ratio between the silanes of the formula (I) and those of the formula (II) is preferably exactly or approximately 1:1. Preferably, the selection of the two components is such that the mixture has a number of aliphatic groups that is as large as possible, i.e., both groups $R^1$ of the silanediol are aliphatic groups and the index sum a+b in the compound of formula (I) is 2, wherein the group $R^2$ is then preferably methyl. Moreover, it is desirable that the aliphatic groups in the silane of the formula (II) are at least partially sterically demanding, for example, $R^1$ is isopropyl, isobutyl, or cyclohexyl.

Additionally, optionally other components (for example, for increasing the inorganic spatial crosslinked density, the hardness, and the abrasion resistance of the resulting polycondensate) can be added, for example, alkoxides of aluminum, boron, and germanium or transition metal alkoxides in amounts of preferably maximally 30% by weight. Other possible additives are conventional lacquer additives, fillers, leveling agents, and/or pigments.

The silane components are preferably used in a suitable solvent that is, if possible, free of water. Solvents can be, for example, alkoxylated low alkane acid esters, for example, acetic acid ester. Their ester groups are derived preferably from straight-chain or branched $C_1$-$C_8$ alkyl alcohols, for example, isopropyl alcohol or isobutyl alcohol. The mixture contains preferably a suitable condensation catalyst, for example, tetrabutyl ammonium fluoride trihydrate. Its quantity is kept so minimal that the contained $H_2O$ does not play any significant role as a reactant in the reaction.

As needed, the mixture is carefully warmed or heated. Repeated heating over an extended period of time to a temperature below the boiling point of the solvent, for example, to approximately 80° C., and intermittent cooling to room temperature is beneficial. The provided reaction medium as well as the volatile components produced by the condensation such as alcohols are removed generally at least partially, in the case of suitable viscosity properties also completely, for example, by distilling on a rotary evaporator and/or optionally by means that enable lower pressures in order to complete the condensation reaction and to suppress residual SiOH groups within the system as much as possible, or completely.

The products obtained in this way are generally resin-like and have viscosities that enable further processing of the products as such. Optionally (for example, when their viscosity is too high for the proposed further processing), they can be diluted with a suitable solvent, or an appropriate amount of solvent can be left within the resin.

In specific embodiments of the invention, the silane resins can be obtained in that a further silicic acid polycondensate, for example, in the form of a liquid or particulate resin, or optionally also an already organically crosslinked inorganic-organic hybrid polymer, for example, in the form of solid particles, can be added to the reaction medium, before and/or during and/or after condensation of the starting materials as described above, wherein also these materials have been obtained or optionally have been additionally polymerized already via the contained organic groups in accordance with the present invention. They can be the same condensates as those to which they are admixed, for example, hybrid polymers produced therefrom. Alternatively, they can be produced from other starting materials. In particular, when the further polycondensate or hybrid polymer differs chemically from the polymerization product that is otherwise employed or to be produced or its potential organic polymerization product, the admixture or embedding of these second silane resins or hybrid polymer components enables the combination of different properties of different resin or resin particle systems. The properties of the resulting polycondensates, for example, the refractive index, the thermal expansion coefficient or the polymerization shrinkage, can be adapted in this way to the requirements of each application.

The resins according to the invention can be structured according to known methods thermally or photochemically, preferably in the UV range. Suitable photoinitiators in this connection are, for example, the following substances obtainable from the Ciba-Geigy Company: Irgacure 184, Irgacure 369, Irgacure 500, and other Irgacure compounds; as well as the following substances obtainable from the Merck Company: Darocure 1173, Darocure 1116, Darocure 1398, Darocure 1174, and Darocure 1020; and the Cyracure products of the Union-Carbide Company; moreover, benzophenone, 2-chlorothioxanthone, 2-methylthioxoanthone, 2-isopropylthioxanthone, benzoine, or 4,4'-dimethoxy benzoine. These substances are conventionally employed in amounts of 0.5 to 5% by weight based on the reaction mixture. When curing is carried out in visible light, the initiator can be, for example, camphorquinone. Suitable as thermal initiators are in particular organic peroxides in the form of diacyl peroxides, peroxy dicarbonates, alkyl peresters, perketales, ketone peroxides, and alkyl hydroperoxides. Concrete and preferred examples for thermal initiators are dibenzoyl peroxide, t-butyl perbenzoate, and azobis isobutyronitrile.

After development, three-dimensionally structured articles are obtained that are suitable, for example, for microsystems technologies. The products exhibit very good reproducibility in regard to all material properties, for example, the refractive index, viscosity, temperature resistance, processability in all process steps of UV structuring (film thickness of 1-150 μm are preferred), as well as dielectric constants of under 3, preferably under 2.5. The dielectric loss tanδ in the extremely high frequency range of 24 to 42 GHz or at the extremely high frequency of 77 GHz is under 0.010, preferably under 0.004. The temperature resistance is surprisingly high; it is, measured thermogravimetrically according to Example 5, generally above 350° C., often (in particular under nitrogen atmosphere) even above 400° C. The resins are free of Si—OH and exhibit excellent adhesion to very different substrates, for example, silicon, glass, metals, preferably aluminum, and other oxidic surfaces.

Surprisingly, it was found that the silanediols used for the preparation of the silane resins can be prepared very gently and in good yields by hydrolysis of appropriate dialkyl dialkoxy silane compounds (Example 1) at a defined pH that must be very precisely maintained (in order to prevent polymerization reactions and in order to catalyze hydrolysis) and at controlled temperatures, for example, from the methoxy, ethoxy or other low alkoxy compounds. For hydrolysis, water is preferably used in stoichiometric amounts or in slightly over-stoichiometric amounts. As a solvent, an alcohol such as ethanol or isopropyl alcohol, an ether such as diethyl ether, tertiary butyl methyl ether, an ester or a ketone such as acetone is advantageously used. The reaction is catalytically controlled and governed, preferably by adding an acid such as strongly diluted HCl for adjusting a slightly acidic pH value (in particular, in the range of 3-4).

Moreover, it was found that the silanediols employed for producing the silane resins can also be produced gently and in good yields from the appropriate dialkyl dihalogen silane compounds (Examples 2 and 3) by hydrolysis at controlled temperatures, for example, from fluoro, chloro, or bromo compounds. Water is preferably used in stoichiometric amounts or slightly over-stoichiometric amounts for hydrolysis. In this connection, for the above described reasons (danger of polycondensation) the use of trialkyl-substituted amines, preferably triethylamine, also in stoichiometric or slightly over-stoichiometric amounts, is mandatory for buffering the produced acid. As a solvent, an alcohol such as ethanol or isopropyl alcohol, an ether such as diethyl ether, tertiary butyl methyl ether, an ester, or a ketone such as acetone is used advantageously.

In the following, the invention will be explained in more detailed with the aid of examples.

EXAMPLE 1

Diisobutyl Silanediol reaction equation: $(C_4H_9)_2Si(OCH_3)_2 + H_2O \rightarrow (C_4H_9)_2Si(OH)_2 + 2\ HOCH_3$ starting components:

| (1) diisobutyl dimethoxy silane | 5.11 g (0.025 mol) |
| (2) water | 0.90 g (0.050 mol) |
| (3) isopropanol | 0.60 g |

The components (1)-(3) are placed into a vessel at room temperature. Subsequently, approximately 3.0 g of an 0.1 n HCl solution are added dropwise until the pH drops to 4.5. A careful pH control is required here. The pH increases continuously (5-6) so that approximately an additional amount of 0.75 g of an 0.1 n HCl solution is added until the pH remains constant at 4. The mixture is stirred at room temperature for one day until a white precipitate forms. In order to dissolve the precipitate, approximately 14 ml diethyl ether are added; subsequently, approximately 15 ml water and 5 ml NaOH (pH 8). The two phases are then separated in a separating funnel; the aqueous phase is then extracted with diethyl ether (2×10 ml) and the organic phases are combined and subsequently washed with approximately 15 ml water. The pH check of the aqueous and organic phases provides a value of 7. The organic phase is then dried with sodium sulfate (anhydrous). The organic phase is then filtered and again washed with diethyl ether.

The ether phase is then distilled on a rotary evaporator first at room temperature. The pressure is successively lowered within 30 minutes from 600 to 14 mbar. The temperature of the water bath is increased from 20 to 65° C. (at a constant 14 mbar). The distillation is interrupted at this point because in the recipient vessel crystal formation is observed; upon cooling and drying in air, complete crystallization is observed. The colorless crystals are dissolved in 50 ml heptane; then left for 4 days at room temperature, and very fine colorless crystal needles are formed. Finally, the crystals are filtered off and washed with heptane.

Upon drying, very fine colorless crystal needles are formed that appear to be very voluminous ("glass wool"-like). The yield of diisobutyl silanediol is determined to be approximately 3 g which is approximately 70%. The melting point is between 91-98° C.

Spectroscopic characterization:

IR (poly-(chlorotrifluoro ethylene)): ν=3265 (w), 2952 (s), 2866 (s), 1464 (s), 1364 (s), 1202 (s), 1125 (s), 1098 (s), 1042 (s), 969 (s), 900 (s), 851 (s), 768 (s), 601 (s) cm$^{-1}$ $^1$H-NMR (400.1 MHz, CD$_3$COCD$_3$): δ 0.64 (m, 4H, —Si(C$\underline{H}_2$CH)$_2$), 0.99 (m, 12H, —Si(CH$_2$CH(C$\underline{H}_3$)$_2$)$_2$), 1.88 (m, 2H, —Si(CH$_2$C$\underline{H}$)$_2$), 7.30 (s, 2H, —Si(O$\underline{H}$)$_2$) ppm $^{13}$C-NMR (100.6 MHz, CD$_3$COCD$_3$): δ 24.4 (—$\underline{C}$H), 26.2 (—$\underline{C}$H$_3$), 26.5 (—$\underline{C}$H$_2$) ppm $^{29}$Si-NMR (79.5 MHz, CD$_3$COCD$_3$): δ approx. −8.5 ppm.

EXAMPLE 2

Dicyclohexyl Silanediol

| (1) dicyclohexyl dichloro silane | 50.7 g (0.19 mol) |
| (2) tertiary butylmethylether | 260 ml |
| (3) triethylamine | 39.6 g (0.39 mol) |
| (4) water | 7.60 g (0.42 mol) |
| (5) tertiary butylmethylether | 600 ml |
| (6) acetone | 60 ml |
| (7) triethylamine | 1.64 g (0.02 mol) |
| (8) pentane | 560 ml |

The components (3)-(6) are placed into a vessel and precooled to 4° C., and, subsequently, the mixture of (1) and (2) also precooled to 4° C., is slowly added in a dropwise fashion within 2.5 hours. The mixture is stirred for further 3 hours at 4° C. Since the pH value drops to 5.5, additional (7) is added, and the mixture is stirred over night at room temperature (RT). The precipitate is filtered off and the residue is washed with (2). Most of the solvent (~90%) in the filtrate is distilled off (at 40° C.). To the residue, (8) is added and a precipitate is formed that is filtered off, washed with (8), and subsequently dried in a desiccator. The yield of the pure product was between 68, 87, and 93% (finely divided white precipitate). For these three preparations the melting point fluctuated as follows: 164.9-166.9; 164.7-168.4; and 165.5-168° C.

EXAMPLE 3

Diisopropyl Silanediol reaction equation: $(C_3H_7)_2SiCl_2 + H_2O \rightarrow (C_3H_7)_2Si(OH)_2 + 2\ HCl$ starting components:

| (1) diisopropyl dichloro silane | 4.26 g (0.02 mol) |
| (2) diethylether | 70 ml |
| (3) triethylamine | 4.76 g (0.05 mole) |
| (4) water | 0.90 g (0.05 mole) |
| (5) diethylether | 30 ml |
| (6) acetone | 70 ml |

Similar to the preparation of the already known diisobutyl silanediol, the components (3-6) are placed into a vessel at 4° C., and a mixture of (1) in (2), also cooled to 4° C., is carefully added dropwise within 1.5 hours and is then stirred for 1 hour at 4° C. The white precipitate is completely filtered off (at least two times). In the following the solvent is distilled off from the filtrate at 40° C. (10 mbar) on a rotary evaporator (40° C./10 mbar) and a very fine white precipitate is formed that is then recrystallized in heptane resulting in "glass wool"- like, colorless crystal needles that are filtered off and dried yielding 2.08 g (70%) diisopropyl silanediol. The melting point is between 108.5-112.6° C.

Spectroscopic characterization:

IR (KBr): v=3226 (w), 2945 (s), 2866 (s), 1464 (s), 1382 (s), 1247 (s), 1031 (s), 996 (s), 877 (s), 831 (s), 730 (s), 677 (s) cm$^{-1}$ $^1$H-NMR (400.1 MHz, CDCl$_3$): δ 0.85-1.15 (m, 14H, —Si(C$\underline{H}$(CH$_3$)$_2$)$_2$), 2.20-2.70 (s, 2H, —Si(O$\underline{H}$)$_2$) ppm $^{13}$C-NMR (100.6 MHz, CDCl$_3$): δ 12.7 (—$\underline{C}$H), 17.0 (—$\underline{C}$H$_3$) ppm $^{29}$Si-NMR (79.5 MHz, CDCl$_3$): δ −3.75 ppm.

EXAMPLE 4

Preparation of a Silane Resin According to the Invention

| | |
|---|---|
| (1) 3-methacryloxy propyl trimethoxy silane (NT) | 1.86 g (0.008 mol) |
| (2) dicyclohexyl silanediol | 1.72 g (0.008 mole) |
| (3) tetrabutyl ammoniumfluoride trihydrate | 4.70 mg (15.0 μmol) |
| (4) acetic acid isobutyl ester | 4.50 ml |

The components (1)-(4) are placed into a vessel at room temperature and are heated on 6 consecutive days for 8 hours to 80° C., respectively. Inbetween, the mixture is stirred for 16 hours at room temperature. Then, the solvent is distilled off and the mixture is heated on 3 consecutive days for 8 hours to 80° C. and inbetween stirred for 16 hours at room temperature, respectively. Subsequently, two drops HCl (2 M) are added and the mixture is again heated for 8 hours to 80° C. After the mixture has become clear, the solvent is distilled off, and 3.22 g (90%) of a viscous resin remain. The refractive index n$_{20}$ is 1.4847.

Dielectric constant ε$_r$: 2.81 and dielectric loss tanδ: 0.0045 (in the extremely high frequency range at 24 to 42 GHz, 77 GHz).

Spectroscopic characterization:

IR (NaCl): v=3500 (w), 2922 (s), 2848 (s), 1721 (s), 1638 (s), 1447 (s), 1322 (s), 1297 (s), 1194 (s), 1167 (s), 1105 (s), 1020 (s), 939 (s), 911 (s), 893 (s), 847 (s), 818 (s), 785 (s), 748 (s), 538 (s) cm$^{-1}$

COMPARATIVE EXAMPLE TO EXAMPLE 4

Example 4 was repeated but, instead of tetrabutyl ammonium fluoride trihydrate, barium hydroxide was used as a catalyst. At the end of three days, no reaction had been observed.

EXAMPLE 5

Preparation of a Silane Resin According to the Invention

| | |
|---|---|
| p-vinyl phenyl methyl diethoxy silane | 2.57 g (10.9 mmol) |
| diisobutyl silanediol | 2.00 g (11.4 mmol) |
| acetic acid isobutyl ester | 5.14 g |
| tetrabutyl ammonium fluoride trihydrate | 5.90 mg (18.8 μmol) |

(1)-(4) were placed into a vessel and stirred for 51 hours at 80° C. (the mixture became clear after approximately 1 minute). Subsequently, the solvent was distilled off on a rotary evaporator (at 40° C., the pressure is reduced to 100 mbar within 30 minutes). The residue is stirred additionally for 19.5 hours at 80° C. and subsequently the remaining solvent is distilled off on a rotary evaporator (at 40° C., the pressure is reduced to 6 mbar within 2 hours and distillation is continued for 0.5 hours at 6 mbar). The residue of 3.4 g (74%) is clear and ocher-colored and is still relatively liquid.

The refractive index n$_{20}$ of two samples prepared separately according to this example was 1.5054 and 1.5075. For both samples, the dielectric constant ε$_r$ was 2.47; the dielectric loss tanδ was determined to be 0.0038 and 0.0035, respectively (measured within the extremely high frequency range at 24 to 42 GHz, 77 GHz).

The material exhibits a temperature resistance up to at least 415° C. (measured thermogravimetrically under nitrogen at a heating rate of 5° C./minute; weight loss <5%).

Spectroscopic characterization:

IR (NaCl): v=3065 (s), 2954 (s), 2897 (s), 2869 (s), 1746 (s), 1630 (s), 1600 (s), 1545 (s), 1465 (s), 1391 (s), 1365 (s), 1330 (s), 1260 (s), 1222 (s), 1124 (s), 1078 (s), 1017 (s), 989 (s), 953 (s), 908 (s), 832 (s), 810 (s), 770 (s) cm$^{-1}$

EXAMPLE 6

Preparation of a Silane Resin According to the Invention

| | |
|---|---|
| p-vinyl phenyl methyl diethoxy silane | 3.47 g (14.7 mmol) |
| diisopropyl silanediol | 2.18 g (14.7 mmol) |
| acetic acid isobutyl ester | 6.83 g |
| tetrabutyl ammonium fluoride trihydrate | 7.70 mg (24.4 μmol) |

(1)-(4) are placed into a vessel and stirred for 13 days at room temperature (the mixture became dear after 1 day). Subsequently, the solvent is removed on a rotary evaporator (at 40° C. the pressure is reduced to 120 mbar within 15 minutes and remains at this value for another 30 minutes). The residue is stirred additionally for 28 hours at room temperature and is then distilled off on a rotary evaporator (at 40° C. the pressure is reduced to 10 mbar within 1.25 hours and remains at 10 mbar for 1 hour). The residue of 4.97 g (88%) is cdear and amber-colored and is still very liquid. The refractive index n$_{20}$ is 1.5043.

Dielectric constant ε$_r$: 2.59 and dielectric loss tanδ: 0.008 (in the extremely high frequency range at 24 to 42 GHz, 77 GHz).

Spectroscopic characterization

IR (NaCl): v=2945 (s), 2867 (s), 2869 (s), 1746 (s), 1630 (s), 1600 (s), 1464 (s), 1390 (s), 1260 (s), 1124 (s), 1090 (s), 1025 (s), 1010 (s), 909 (s), 885 (s), 832 (s), 809 (s), 759 (s), 693 (s) cm$^{-1}$

What is claimed is:

1. A method for preparing a silanediol of the general formula (II)

$$R^1{}_2Si(OH)_2 \qquad (II)$$

wherein $R^1$ is identical or different and is a straight-chain, branched, or cyclic, optionally substituted, $C_1$-$C_{12}$ alkyl group or a group that can be polymerized photochemically and/or thermally via an organic group by radical polymerization or cationic polymerization, the method comprising the step of:

performing a controlled hydrolysis by maintaining an acidic pH value with a lower limit of the acidic pH value at pH 3 of a compound of the general formula (III)

$$R^1{}_2Si(OR^3)_2 \qquad (III)$$

wherein $R^1$ has the meaning as provided for formula (II) and wherein $R^3$ is a $C_1$-$C_6$ alkyl group;

wherein the hydrolysis of the $OR^3$ group is carried out with a stoichiometric amount of water or a slightly over-stoichiometric amount of water in a non-aqueous solvent.

2. The method according to claim 1, wherein $R^3$ is ethyl, n-propyl, isopropyl, or isobutyl.

3. The method according to claim 1, wherein the pH value is approximately 3-4.

4. The method according to claim 1, wherein the non-aqueous solvent is selected from the group consisting of alcohol, ethers, esters, and ketones.

* * * * *